(12) United States Patent
Yeh et al.

(10) Patent No.: US 8,947,757 B2
(45) Date of Patent: Feb. 3, 2015

(54) ELECTROCHROMIC GLAZING WITH SERIES CONNECTED CELLS, AND PRODUCTION METHOD THEREFOR

(75) Inventors: Li-Ya Yeh, Geilenkirchen (DE); Philippe Letocart, Raeren (BE); Bastien Royer, Remagen (DE); Norbert Huhn, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 236 days.

(21) Appl. No.: 13/579,047

(22) PCT Filed: Feb. 17, 2011

(86) PCT No.: PCT/EP2011/052381
§ 371 (c)(1),
(2), (4) Date: Nov. 21, 2012

(87) PCT Pub. No.: WO2011/101427
PCT Pub. Date: Aug. 25, 2011

(65) Prior Publication Data
US 2013/0057939 A1    Mar. 7, 2013

(30) Foreign Application Priority Data
Feb. 19, 2010 (EP) ..................... 10001711

(51) Int. Cl.
*G02F 1/15* (2006.01)
*G02F 1/155* (2006.01)
*G02F 1/163* (2006.01)

(52) U.S. Cl.
CPC .............. *G02F 1/155* (2013.01); *G02F 1/1523* (2013.01); *G02F 1/163* (2013.01); *G02F 2201/122* (2013.01)
USPC ...................................... 359/265

(58) Field of Classification Search
CPC ......... G02F 1/15; G02F 1/153; G02F 1/1533; G02F 1/155
USPC .......................................... 359/265
See application file for complete search history.

(56) References Cited

U.S. PATENT DOCUMENTS
6,337,758 B1   1/2002   Beteille et al.
6,952,299 B1   10/2005  Fukazawa et al.
(Continued)

FOREIGN PATENT DOCUMENTS
EP   0338876 A1 * 10/1985   ................ G02F 1/17
EP   0 338 876        7/1993
(Continued)

OTHER PUBLICATIONS
English language translation of International Preliminary Report on Patentability and Written Opinion issued Aug. 21, 2012 in PCT/EP2011/052381 filed Feb. 17, 2011.
(Continued)

Primary Examiner — Joseph P Martinez
(74) Attorney, Agent, or Firm — Oblon, Spivak, McClelland, Maier & Neustadt, L.L.P.

(57) ABSTRACT

An electrochromic glazing containing: a substrate including a layer structure thereon, which contains a first and second electrode layer, between which a first and second electrochemically active layer are situated, which each reversibly incorporate ions, wherein the first active layer contains an electrochromic material and the two active layers are separated from each other by an electrolyte layer, the layer structure being subdivided into series-connected electrochromic cells by a transition zone comprising: a first trench; a second trench; and a third trench between the first and second trenches, wherein the first and second trenches subdivide the first and second electrode layers into first electrode sections electrically insulated from each other and second electrode sections electrically insulated from each other, respectively, and the third trench is filled with an electrically conductive material, by which the first and second electrode sections of the cells adjacent the transition zone are electrically connected.

16 Claims, 5 Drawing Sheets

(56) References Cited

U.S. PATENT DOCUMENTS

2003/0053188 A1* 3/2003 Van Der Sluis et al. ...... 359/266
2004/0032220 A1 2/2004 Cok et al.

FOREIGN PATENT DOCUMENTS

| | | | | |
|---|---|---|---|---|
| EP | 1 394 598 | 3/2004 | | |
| EP | 1 396 676 | 3/2004 | | |
| EP | 1394598 A1 * | 3/2004 | ................ | G02F 1/15 |
| FR | 2 781 084 | 1/2000 | | |
| FR | 2781084 A1 * | 1/2000 | ............ | H01M 10/36 |
| JP | 61-249026 * | 11/1986 | ................ | G02F 1/17 |
| JP | 61 249026 | 11/1986 | | |

OTHER PUBLICATIONS

International Search Report Issued Jun. 1, 2011 in PCT/EP11/52381 Filed Feb. 17, 2011.

\* cited by examiner

ELECTROCHROMIC GLAZING WITH SERIES CONNECTED CELLS, AND PRODUCTION METHOD THEREFOR

The invention is in the technical field of optically active components and relates, according to its generic type, to an electrochromic glazing according to the preamble of claim 1 and a production method therefore.

Electrochromic glazings, in which optical transmission can be varied by supplying electrical power, are known per se and have already been variously described in the patent literature. Reference is made, merely by way of example, to the European patents EP 0338876, EP 0408427, EP 0628849, EP 1859319 B1, and the U.S. Pat. No. 5,985,486.

In general, electrochromic glazings include at least one transparent substrate, onto which a sequence of layers comprising a plurality of functional layers is applied. This usually includes two electrode layers and two electrochemically active layers that are located between the two electrode layers and are separated from each other by an electrolyte layer. The two active layers are each capable of reversibly storing small ions (e.g., $H^+$, $Li^+$), with at least one of the two layers consisting of an electrochromic material that has different oxidation states that correspond to the stored or released state of the ions and have a different color. By application of electrical voltages of different polarity, the storing or releasing ions can be controlled to selectively influence the optical transmission. Electrochromic glazings are, in particular, used in buildings and motor vehicles to steplessly regulate the amount of incident light.

As has been demonstrated in practice, the switching times of electrochromic glazings necessary for changing the optical transmission increase greatly with enlargement of the glazing area. This can, undesirably, result in the fact that the efficiency of electrochromic glazings, which are used, for example, to regulate room temperature, is reduced. Moreover, a fast change in the optical transmission of the glazing can be important to the user, for example, to have effective antiglare protection against sunlight at the time of changing light conditions.

The person skilled in the art knows that a major cause of the surface area-dependent increase in switching time of electrochromic glazings resides in an only limited electrical conductivity of the transparent electrode layers. Depending on the composition of the electrode layer and its layer thickness, the electrical sheet resistance of transparent electrode layers is typically in the range from ca. 5 ohm to 80 ohm.

The international patent application WO 00/57243 A1 discloses coating an electrode layer made of a transparent metal oxide with a network of a conductive paste, in order to increase the conductivity of the electrode layer. The measure presented there is technically relatively complicated and requires additional process steps, in particular, in order to generate higher process temperatures for drying the conductive paste.

In contrast, the object of the present invention consists in making available an alternative capability by means of which a reduction in switching times of electrochromic glazings can be obtained.

This and other objects are accomplished according to the proposal of the invention by means of an electrochromic glazing with the characteristics of the independent claim. Advantageous embodiments of the invention are indicated by the characteristics of the dependent claims.

The electrochromic glazing comprises, according to its generic type, at least one substrate made of a transparent material and a layer structure applied on the substrate, which structure is made up of a plurality of functional layers. It is understood that the glazing does not necessarily have to contain one or a plurality of glass substrates, but that it can also be made of a non-glass material, e.g., plastic.

The layer structure of the electrochromic glazing comprises two electrode layers, referred to in the following as the first and second electrode layer, which are, in each case, made of a material with a high electron conductivity. Between the two electrode layers are situated two electrochemically active layers, referred to in the following as first and second active layer, which are suited for the reversible incorporation of ions. Here, the first active layer consists of an electrochromic material and serves, by means of the capability of an electrically controlled change in its optical transmission (transparency) as a coloring layer, whereas the second active layer serves as an ion storage layer or counter electrode. The two active layers are separated from each other by an electrolyte layer made from a material that has a very low or virtually no electron conductivity but has a high ion conductivity, at least for the ions that can be reversibly incorporated into the two active layers. For the first active layer, a cathodically or anodically electrochromic material, which differ from each other, in particular, in that their optical transmission can be changed by connection to the cathode connection in the case of the cathodically electrochromic material or to the anode connection in the case of the anodically electrochromic material, can be used as an electrochromic material. The ion storage layer or counter electrode can be made of a material that either does not change its optical transmission or changes such that the coloration of the first active layer is intensified. In the latter case, the ion storage layer can be made, for example, from an anodically electrochromic material if the first active layer consists of a cathodically electrochromic material or of a cathodically electrochromic material if the first active layer consists of an anodically electrochromic material.

The electrochromic glazing according to the invention is distinguished substantially in that the layer structure is subdivided into series-connected electrochromic cells by one or a plurality of transition zones. The electrochromic glazing can be construed as a series connection of capacitances (cells). Here, and in the following, the term "transition zone" is understood to be a zone of the layer structure that is provided with a trench structure consisting of three trenches. Thus, each transition zone includes a first trench, by which the first electrode layer is subdivided into first electrode sections electrically insulated from each other; a second trench, by which the second electrode layer is subdivided into second electrode sections electrically insulated from each other; and a third trench filled with an electrically conductive material, by which the first electrode section and the second electrode section of the two cells adjacent the transition zone are electrically connected to each other. In the trench structure, the third trench is arranged between the first and second trench. For a series connection of the cells, a specific sequence of the trenches is maintained in each case in the transition zones, with the first trench always situated on one side of the third trench and the second trench always situated on the other side of the third trench.

The electrochromic glazing according to the invention thus has a subdivision of the layer structure into a plurality of electrochromic cells by means of which particularly fast switching times are enabled that can be faster than comparable values in conventional electronic glazings. By means of a monolithically integrated series connection of the cells, the glazing according to the invention can be produced cost-effectively and simply in industrial series production using conventional methods.

In an advantageous embodiment of the electrochromic glazing according to the invention, the second electrode layer is arranged above the first electrode layer, with the third trench of each transition zone filled with the electrically conductive material of the second electrode layer. This measure enables production, that is technically particularly simple and cost-effective of the third trench filled with an electrically conductive material.

In another advantageous embodiment of the electrochromic glazing according to the invention, the first trench of each transition zone is filled with material of one of the two electrochemically active layers, wherein it can be advantageous if the first trench is filled with material of the active layer that is arranged above the respective other active layer. This measure enables production that is technically particularly simple and cost-effective of the first trench filled with an electrically insulated material, provided that the material of the active layers has very low to virtually no electron conductivity, which is usually the case. Likewise, it is also possible for the first trench to be filled with material of the electrolyte layer.

In another advantageous embodiment of the electrochromic glazing according to the invention, the second trench of each transition zone subdivides the layer structure all the way to the first electrode section, by which means particularly effective electrical isolation of adjacent electrochromic cells can be achieved.

In another advantageous embodiment of the electrochromic glazing according to the invention, the layer structure includes a top coating made of an electrically insulating material arranged above the second electrode layer and covering the layer structure, with the second trench of each transition zone filled with the insulating material of the top coating. This measure enables filling that is technically particularly simple and cost-effective of the second trench with an electrically insulating material. Alternatively or additionally, another (second) substrate made of a transparent substrate, e.g., glass, can be provided. In this case, the layer structure is arranged between a first substrate and a second substrate.

Since the series-connected electrochromic cells must have their polarity reversed quickly during the switching process, very small differences in capacitances can cause strong voltage and/or current transients, by means of which the cells can be permanently damaged. Accordingly, in another advantageous embodiment of the electrochromic glazing according to the invention, each electrochromic cell is provided with a device to limit the voltage applied to the cell, which can be configured, for example, as an anti-parallel-connected diode (based on the polarity of an electrical power source (e.g., voltage source) for the contacting of the electrode layers) with a predefined breakdown voltage. The diodes can, for example, be configured as zener diodes. By means of the voltage limitation device associated with each cell, overvoltage protection is advantageously provided for each cell. With the use of antiparallel-connected diodes, it is only necessary to adapt the breakdown voltage of the diodes to the voltage and/or current peaks occurring in practice.

In another advantageous embodiment of the electrochromic glazing according to the invention, each transition zone has a maximum width in the range from 100 μm to 500 μm, preferably in the range from 150 μm to 250 μm. The width of the transition zones is measured, in each case, perpendicular to the path of the trench contained therein. It can be further advantageous for a distance between adjacent trenches of one and the same transition zone, also measured perpendicular to the path of the trench, to be at least 50 μm and/or for a width of a respective trench, also measured perpendicular to its path, to be in the range from 30 μm to 100 μm. Through these measures, the least possible loss of optically active area of the electrochromic glazing, on the one hand, and a reliable and secure series connection of the electrochromic cells, on the other, can be obtained through the use of conventional structuring techniques. In addition, an attractive external appearance of the electrochromic glazing can be obtained by means of the trenches discernible to the observer as fine lines. The substrate can have, for example, a length and width each of which is in the range from 0.5 m to 3 m.

In another advantageous embodiment of the electrochromic glazing according to the invention, an attractive external appearance can also be obtained in that the substrate is provided on a side turned away from the layer structure with one or a plurality of opaque (nontransparent) cover elements, which are, in each case, associated with a transition zone and completely cover it. In an electrochromic glazing with two substrates, between which the layer structure is situated, the opaque strips can be provided on one substrate and/or on the other substrate.

In another advantageous embodiment of the electrochromic glazing according to the invention, it includes a power source (e.g., a voltage source) for the contacting of the series-connected cells, wherein an electrical voltage of the electrical power source is selected as a function of the number of cells such that, at the time of application by the power source, a voltage in the range from 0.5 volt to 3 volt, preferably in the range from 1.2 volt to 1.8 volt is applied to each cell. Through this measure, the electrochromic cells can be operated with a (low) switching voltage particularly advantageous for practical application. It can be further advantageous for the power source for the contacting of the two electrode layers to have a voltage of a maximum of 1000 volt, preferably a maximum of 120 volt. The voltage can, in particular, be in the range from 30 volt to 50 volt, such that, for example, a maximum supply voltage for façade elements legally prescribed in some countries is not exceeded. In general, with a supply voltage $V_b$ provided by the power source and with a given switching voltage $V_s$ of the cells, the number n of the cells can be determined by the formula $n=V_b/V_s$.

In another advantageous embodiment of the electrochromic glazing according to the invention, the layer structure is subdivided into a plurality of cell regions electrically insulated from each other by one or a plurality of fourth trenches crossing the first through the third trenches, wherein each cell region includes a plurality of series-connected electrochromic cells, with the cell regions, for example, parallel-connected by two common contact elements. The cell regions can be monolithically integrated or connected in parallel by cabling. The parallel-connected cell regions enable, particularly advantageously, covering relatively large areas with the electrochromic glazing without the requirement of increasing the supply voltage in a corresponding manner. It is also conceivable for the cell regions to be configured as autonomous components or electrochromic modules.

The invention further extends to a method for production of an electrochromic glazing, comprising the following steps:
Preparation of a substrate with a layer structure applied on the substrate, wherein the layer structure has at least two electrode layers, between which a first electrochemically active layer and a second electrochemically active layer are situated, which are, in each case, suitable for the reversible incorporation of ions, wherein the first active layer consists of an electrochromic material and serves as coloring layer and the second active layers servers as ion storage layer, and wherein the two active layers are separated from each other by an electrolyte layer;

Production of first trenches, by which a first of the two electrode layers is subdivided into first electrode sections electrically insulated from each other;

Production of second trenches, by which the second of the two electrode layers is subdivided into second electrode sections electrically insulated from each other;

Production of third trenches filled with an electrically conductive material, which are, in each case, arranged between a first trench and a second trench, wherein, in each case, a first electrode section and an (adjacent) second electrode section are electrically connected to each other via the third trenches.

Moreover, the invention extends to the use of an electrochromic glazing as described above as a measure at least partially delimiting a space in the architectural facilities, for example, buildings, houses, and apartments, and/or in vehicles, for example, motor vehicles, and/or in aircraft, for example, airliners and freight aircraft and aircraft of sport aviation, and/or in watercraft, for example, cruise ships, container ships, and boats for sport navigation.

The invention also relates to an electrochromic glazing with at least one substrate and a layer structure applied on the substrate, wherein the layer structure has at least two electrode layers, between which are situated a first electrochemically active layer and a second electrochemically active layer, wherein the first active layer consists of an electrochromic material, and wherein the two active layers are separated from each other by an electrolyte layer. It is significant here that the layer structure is subdivided into series-connected electrochromic cells by one or a plurality of transition zones, wherein each transition zone comprises:

a first trench, by which a first of the two electrode layers is subdivided into first electrode sections electrically insulated from each other;

a second trench, by which a second of the two electrode layers is subdivided into second electrode sections electrically insulated from each other;

a third trench filled with an electrically conductive material, by which the first electrode section and the second electrode section of the cells adjacent the transition zone are electrically connected to each other;

wherein the third trench is arranged between the first trench and the second trench.

Such an electrochromic glazing can be configured according to the above-described embodiments.

The invention further relates to a method for the production of an electrochromic glazing comprising the following steps:

Providing of a substrate with a layer structure applied on the substrate, wherein the layer structure has at least two electrode layers, between which a first electrochemically active layer and a second electrochemically active layer are situated, wherein the first active layer consists of an electrochromic material and wherein the two active layers are separated from each other by an electrolyte layer;

Production of first trenches, by which a first of the two electrode layers is subdivided into first electrode sections electrically insulated from each other;

Production of second trenches, by which the second of the two electrode layers is subdivided into second electrode sections electrically insulated from each other;

Production of third trenches filled with an electrically conductive material, which are, in each case, arranged between a first trench and a second trench, wherein, in each case, a first electrode section and a second electrode section are electrically connected to each other via the third trenches.

It is understood that the various embodiments of the invention can be realized individually or in any combinations. In particular, the above mentioned characteristics and those to be explained in the following can be used not only in the combinations indicated but also in other combinations or alone, without departing from the scope of the present invention.

BRIEF DESCRIPTION OF THE DRAWINGS

The invention is now explained in detail with reference to exemplary embodiments, referring to the accompanying figures. They depict.

DETAILED DESCRIPTION OF THE DRAWINGS

Figure 1:
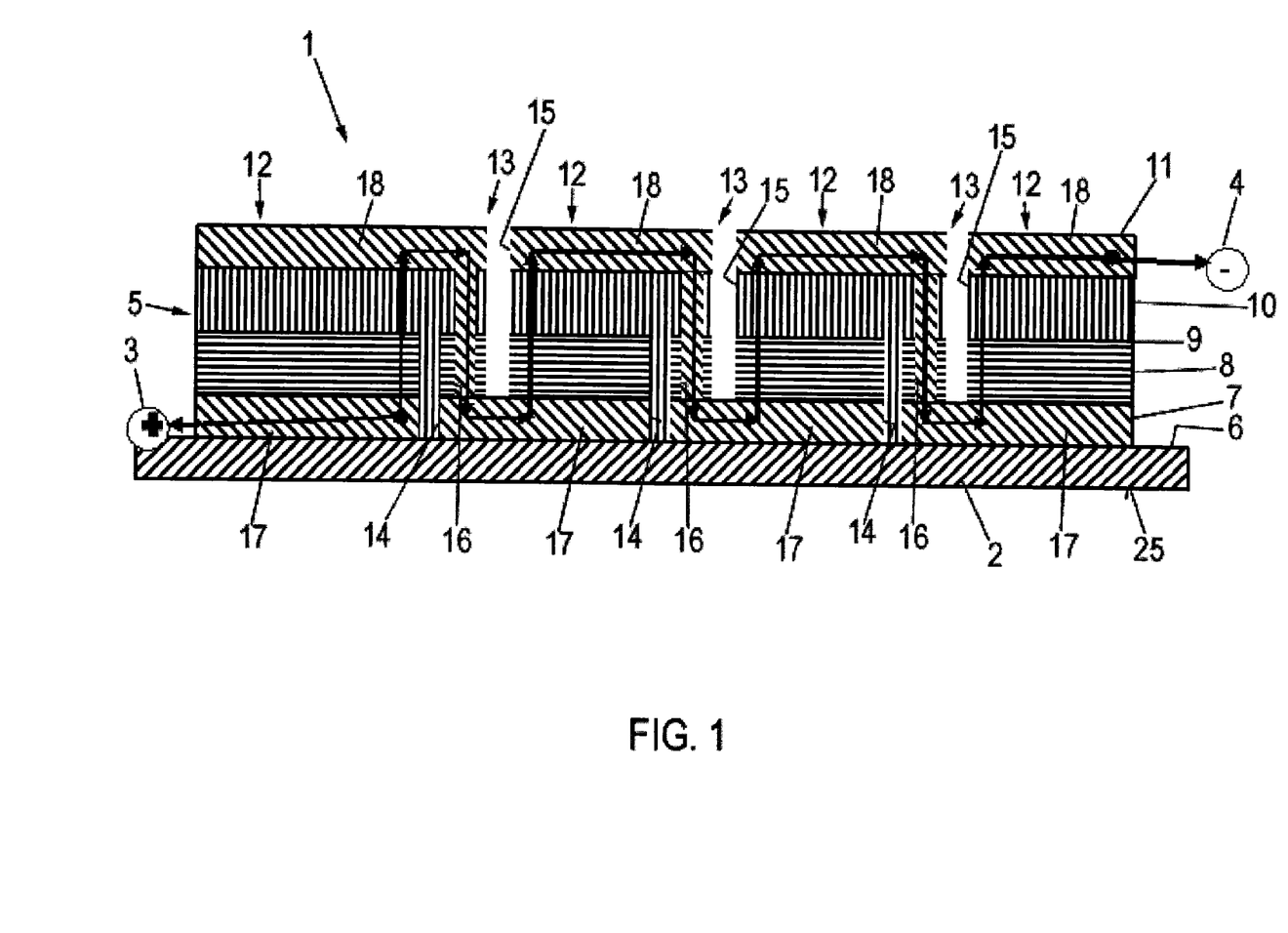
FIG. 1 a schematic cross-sectional representation of an exemplary embodiment of the electrochromic glazing according to the invention.

FIG. 1 illustrates, as an exemplary embodiment of the invention, an electrochromic glazing designated in general with the reference number 1, which is implemented here, for example, as a composite layer structure. The optical transmission of the electrochromic glazing 1 can be varied by applying an electrical DC voltage and/or direct current of appropriate magnitude and polarity. For this purpose, an electrical voltage source or power source (not shown) is provided, whose anode connection 3 and cathode connection 4 are indicated schematically in FIG. 1.

The electrochromic glazing 1 comprises at least one transparent substrate 2 and a layer structure 5 applied on a first surface 6 of the substrate 2. The transparent substrate can be made of a glass or a non-glass material, for example, soda lime glass or borofloat glass, with a thickness in the range from, for example, 0.7 to 10 mm, in particular, 2 mm. The substrate 2 can have, for example, a length of ca. 1000 mm and a width of ca. 500 mm.

The layer structure 5 includes at least five functional layers that are applied on the substrate 6 in the sequence indicated: a first electrode layer 7 applied on the first surface 6 of the substrate 2, a second active layer 8 applied on the first electrode layer 7, an electrolyte layer 9 applied on the second active layer 8, a first active layer 10 applied on the electrolyte layer 9, and a second electrode layer 11 applied on the first active layer 10. The layer structure 5 thus includes two electrode layers 7, 11, between which the two electrochemically active layers 8, 10 are arranged, which, for their part, are separated from each other by the electrolyte layer 9. Although this is not shown in the figures, the layer structure 5 can contain additional layers, such as a passivation layer between the first surface 6 of the substrate 2 and the first electrode layer 7.

Generally speaking, the two electrode layers 7, 11 can be made, for example, from a transparent conductive metal oxide (TCO), which is well known to the person skilled in the art, for example, from the citations mentioned in the introduction. In particular, the electrode layers 7, 11 can, for example, contain tin-doped indium oxide (ITO), fluorine-doped tin oxide ($SnO_2$:F), zinc oxide (ZnO), or aluminum-doped zinc oxide (ZnO:Al). It is likewise possible for the electrode layers 7, 11 to contain a metal or a metal alloy, such as gold (Au), silver (Ag), copper (Cu), platinum (Pt), aluminum (Al), or mixtures thereof. It is also conceivable for the two electrode layers 7, 11 to be made of a conductive layer stack, consisting, for example, of a layer of doped metal oxide and a metal layer. The electrode layers 7, 11 can contain a layer stack of NiCr/metal/NiCr, wherein the metal includes, for example, gold (Au), silver (Ag), copper (Cu), platinum (Pt), aluminum (Al), or mixtures thereof. In particular, the two electrode layers 7, 11 can be made from a silver (Ag)-based, transparent, conductive layer stack. The two electrode layers 7, 11 can be made of either one and the same material or from materials different from each other. The first electrode layer 7 can, for example, have a sheet resistance of 8 ohm, whereas the second electrode layer 11 has a sheet resistance of, for example, 80 ohm.

The two active layers 8, 10 are, in each case, made of a material that is suitable for the reversible incorporation of ions, wherein the first active layer 10 consists here, for example, of a cathodic electrochromic material and serves as a coloring layer, whose optical transmission can be varied by storage and release of ions and the simultaneous changing of oxidation states. The second active layer 8 serves as an ion storage layer or counter electrode, which does not change its optical transmission with the storage and release of ions.

The electrochromic material of the coloring, first active layer 10 can, for example, include a material or a mixture of materials selected from the group consisting of tungsten oxide, nickel oxide, niobium oxide, indium oxide, molybdenum oxide, vanadium oxide, bismuth oxide, antimony oxide, and titanium oxide. The material or the mixtures of the above-mentioned materials can also include titanium, tantalum, or rhenium. The second active layer 8 serving as a counter electrode can, for example, include a material or a mixture of materials selected from the group consisting of tungsten oxide, nickel oxide, niobium oxide, indium oxide, molybdenum oxide, vanadium oxide, bismuth oxide, antimony oxide, and titanium oxide. The material or mixtures of the above-mentioned materials can also include titanium, tantalum, or rhenium. Likewise, any other material suitable as a counter electrode can be used. The two active layers 8, 10 can have, for example, a width of 480 mm and a length of 980 mm, corresponding to a surrounding edge decoating of the layer structure 5 of 10 mm.

A polymer layer or an inorganic layer can, for example, be used as a material of the electrolyte layer 9 suitable for ion transport. The electrolyte layer 9 includes, for example, silicon oxide, tantalum oxide, hafnium oxide, silicon nitride, molybdenum oxide, antimony oxide, nickel oxide, tin oxide, zirconium oxide, aluminum oxide, niobium oxide, chromium oxide, cobalt oxide, titanium oxide, zinc oxide, aluminum-doped zinc oxide, tin-zinc oxide, vanadium oxide, or mixtures thereof, wherein at least one of the oxides can be hydrated or nitrated. The materials usable for the various functional layers of the layer structure 5 are well known to the person skilled in the art, for example, from the citations mentioned in the introduction. Reference is made here to the materials mentioned there for the functional layers in their entirety, which thus become part of this description.

In the electrochromic glazing 1, the layer structure 5 is subdivided into a plurality of series-connected electrochromic cells 12 by a plurality of transition zones 13. Although in FIG. 1, four cells 12 and three transition zones 13 are depicted, it is understood that the electrochromic glazing 1 can also have a larger or smaller number of cells 12. With a supply voltage $V_b$ of, for example, 48 volt of the power source connected to the electrochromic glazing and a given switching voltage $V_s$=1.6 volt of the cells 12, the number n of cells 12 here is, for example, 30 (n=48/1.6=30).

To subdivide the electrochromic glazing 1 into the various cells 12, each transition zone 13 is provided with a set of trenches 14-16 with a progression parallel to each other. As can be discerned in FIG. 2, the trenches 14-16 have here, for example, a linear progression and run parallel to the first surface 6 of the substrate 2 over the entire layer structure 5. The trenches 14-16 are embossed as vertical trenches, perpendicular in each case to the first surface 6 of the substrate 2. Although this is not depicted in figures, it would be equally possible for the trenches 14-16 to have a nonlinear, for example, meandering, wave-shaped, sawtooth-shaped, or other types of polygonal progression, by means of which, for example, a strip-shaped series connection of the cells 12 is enabled. Each transition zone 13 includes a first trench 14, a second trench 15, and a third trench 16, wherein the sequence of the trenches 14-16 is the same in all transition zones 13. In the exemplary embodiment depicted, the third trench 16 is situated between the first trench 14 and the second trench 15, with the first trench 14 always arranged on one side and the second trench 15 always arranged on the other side of the third trench 16.

In each transition zone 13, the first trench 14 is formed in the electrolyte layer 9, the second active layer 8, and the first electrode layer 7 and filled with material of the first active layer 10. In particular, the first electrode layer 7 is subdivided into a plurality of first electrode sections 17 by the first trenches 14, which sections are electrically insulated from each other, wherein the cathodically electrochromic material of the first electrode layer 10 usually has only very low or no electron conductivity. On the other hand, the second trench 15 extends from the second electrode layer 11 all the way to the first electrode layer 7 such that the second trench 15 is formed in the second electrode layer 11, the first active layer 10, the electrolyte layer 9, and the second active layer 8. In particular, the second electrode layer 11 is subdivided into a plurality of second electrode sections 18 by the second trenches 15, which sections are electrically insulated from each other. Although this is not depicted in figures, the electrochromic glazing 1 can be provided with a top coating made of a material with very low or no electron conductivity covering the layer structure 5, which penetrates at the time of application into the second trenches 15 such that the second trenches 15 are filled with the material of the top coating. In addition, the third trench 16 extends from the first active layer 10 all the way to the first electrode layer 7, such that the third trench 16 is formed in the first active layer 10, the electrolyte layer 9, and the second active layer 8. In this process, the third trench 16 is filled with material of the second electrode layer 11. An electrically conductive connection between the second electrode section 18 of the one cell 12 adjacent the transition zone 13 and the first electrode section 18 of the other cell 12 adjacent the transition zone 13 is produced via the third trench 16, by means of which the cells 12 are series connected to each other. In FIG. 1, for example, each second electrode section 18 is electrically connected to the respective right adjacent first electrode section 17. The electrochromic glazing 1 is subdivided here, for example, by the transition zones 13 into 30 cells 12, which have, in each case, a width of 1.58 mm and a length of 980 mm and are arranged on the substrate 2 parallel to each other and in the form of strips.

In the electrochromic glazing 1, the series-connected electrode sections 17, 18 are electrically connected to two contact strips 19, 20 made, for example, of a metallic material, with a first contact strip 19 connected to the marginal first electrode section 17 and a second contact strip 20 connected to the marginal second electrode section 18. The electrochromic glazing 1 has, in its role as a charge storage device, an electrical capacity, that can be charged and discharged via the power source connected to the two contact strips 19, 20. The series-connected electrochromic cells 12, which, for their part, have a charge storing role, can be regarded as a series connection of capacities. In FIG. 1, this is schematically depicted by a solid line. By means of connection to the anode and cathode connection 3, 4 of the electrical power source, coloring (reduction of optical emission) or decoloring (increase of optical transmission) of the electrochromic glazing 1 can be achieved, as desired. In FIG. 1, the first contact strip 19 is connected, for example, to the anode connection 3 and the second contact strip 20 is connected to the cathode connection 4 of the electrical power source such that the optical transmission of the first active layer 10 made of a cathodically electrochromic material can be altered electrically. If, for example, a voltage of 48 volt is applied, the electrochromic glazing 1 is dark; in a de-energized state, it is clear. With regard to the charge storing role, coloring of the electrochromic glazing 1 results in an electrical charging of the series-connected capacities or cells 12, whereas decoloring of the electrochromic glazing 1 results in a discharge. Merely by way of example, it is noted that, with a contrast of 20, the capacitance of the glazing 1 can be ca. 300 F/m².

In the electrochromic glazing 1, each transition zone 13 has a maximum width measured parallel to the first surface 6 on the substrate 2 and perpendicular to the path of the trenches 14-16 that is preferably in the range from 100 μm to 500 μm, much more preferably in the range from 150 μm to 250 μm, with a distance between two adjacent trenches 14-16 of one and the same transition zone 13 measured in the same direction being preferably at least 50 μm. In addition, a width of a respective trench, also measured in the same direction, is preferably in the range from 30 μm to 100 μm.

In the following Table 1, exemplary values for the dimensioning of the trenches 14-16 and transition zones 13 of the electrochromic glazing 1 are indicated:

TABLE 1

| | Width Transition zone | Width Trench | Distance between adjacent trenches |
|---|---|---|---|
| Example 1 | 190 μm | 30 μm | 50 μm |
| Example 2 | 240 μm | 40 μm | 60 μm |
| Example 3 | 310 μm | 50 μm | 80 μm |

Figure 2:
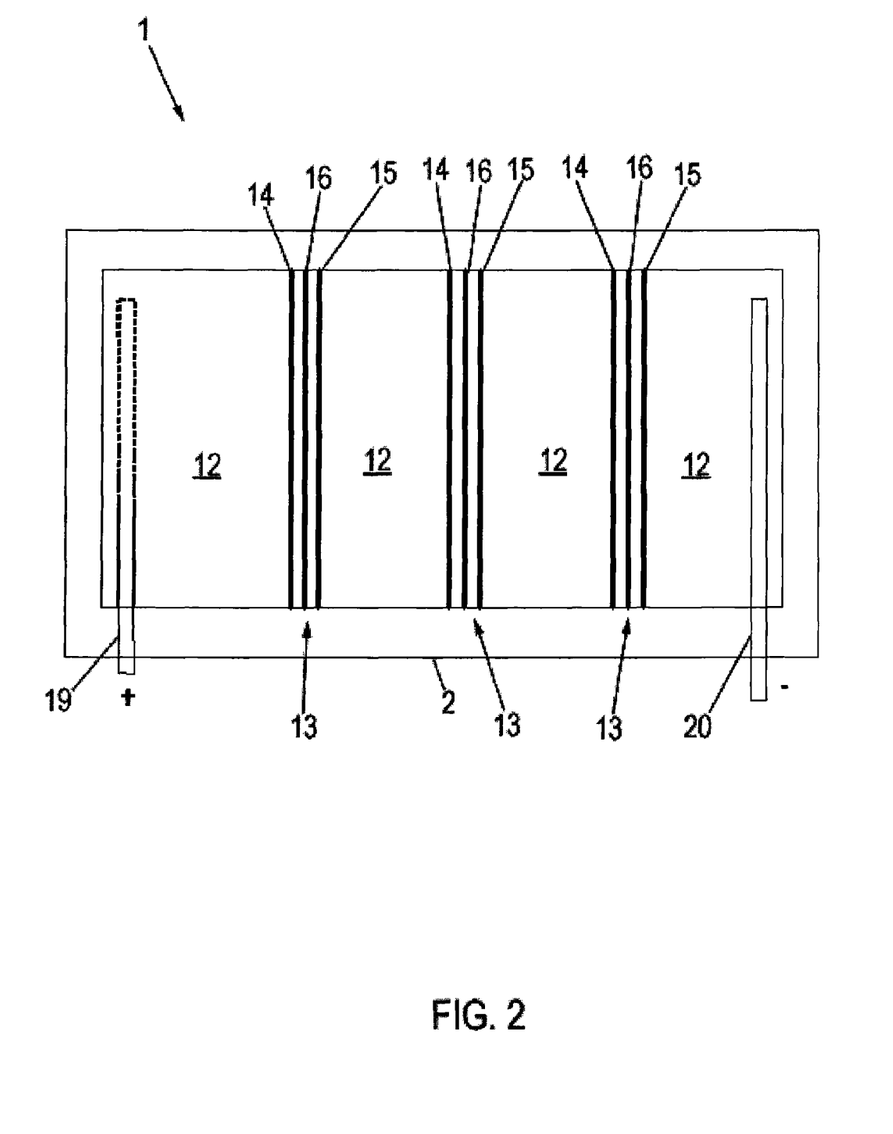
FIG. 2 a schematic top view of the electrochromic glazing of FIG. 1.

As experiments of the applicant have demonstrated, it was possible, for the exemplary embodiment of the electrochromic arrangement 1 depicted in FIGS. 1 and 2, which was implemented according to Example 2 of Table 1, by subdivision into 30 cells 12, to obtain a reduction of the switching time from 60 seconds to 5 seconds.

Figure 3:
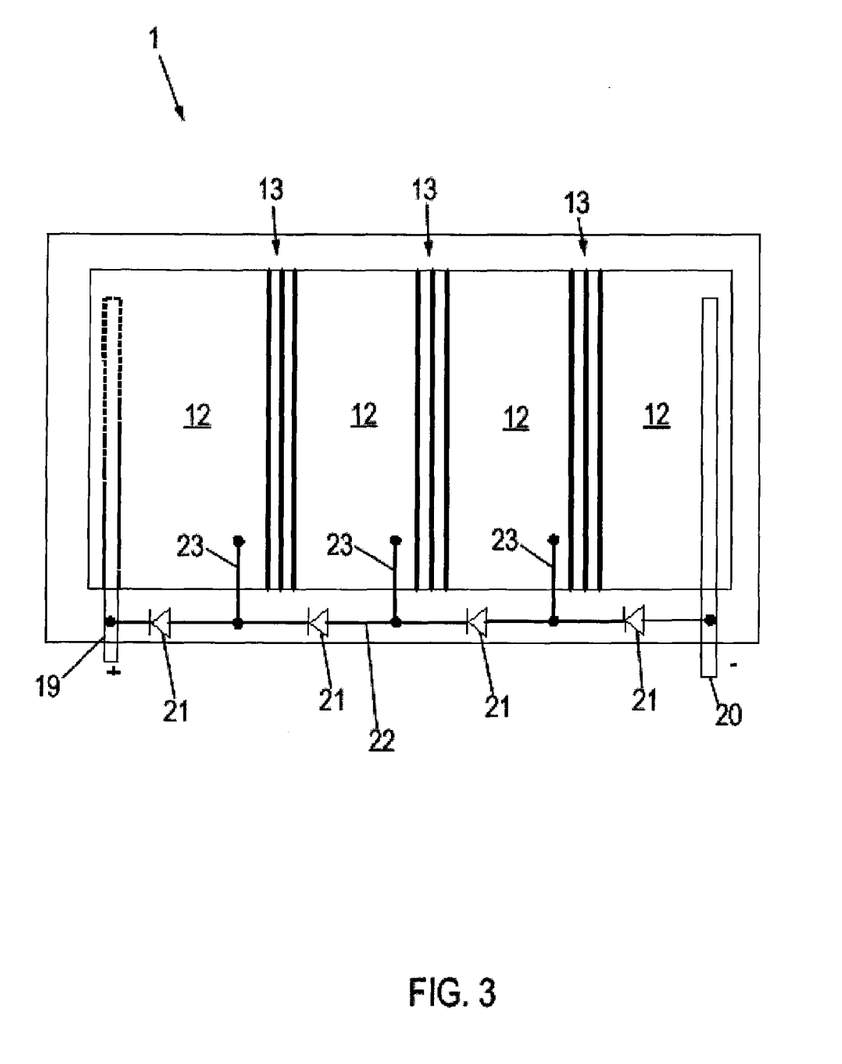
FIG. 3 a schematic top view of another exemplary embodiment of the electrochromic glazing according to the invention.

Referring now to FIG. 3, where another exemplary embodiment of the electrochromic glazing 1 according to the invention is depicted. To avoid unnecessary repetition, only the differences relative to the exemplary embodiment depicted in FIGS. 1 and 2 are explained, referring, for the rest, to the statements made there. According to it, the electrochromic glazing 1 comprises a plurality of diodes 21 that are, for example, configured as zener diodes with a predefined breakdown voltage. Each diode 21 is associated with a cell 12. As is discernible from FIG. 3, the diodes 21 are series-connected via a common first conductor 22 and are connected to the two contact strips 19, 20. From the first conductor 22, second conductors 23 branch off, in each case, which are, in each case, connected to the first electrode section 17 of the cells 12, such that each cell 12 is connected to a reverse-biased (i.e., antiparallel) diode 21. The breakdown voltages of the diodes 21 are selected such that the cells 12 are protected against transient overvoltages that can occur, in particular, during the switching procedure. In the present example, the breakdown voltage of the diodes 21 is, for example, 1.8 volt. In FIG. 3, the diodes 21 are hybrid, i.e., connected to the cells 12 via electrical conductors. Alternatively, it would also be possible for the diodes 21 to be configured monolithically integrated in correspondence with the cells 12.

Figure 4:
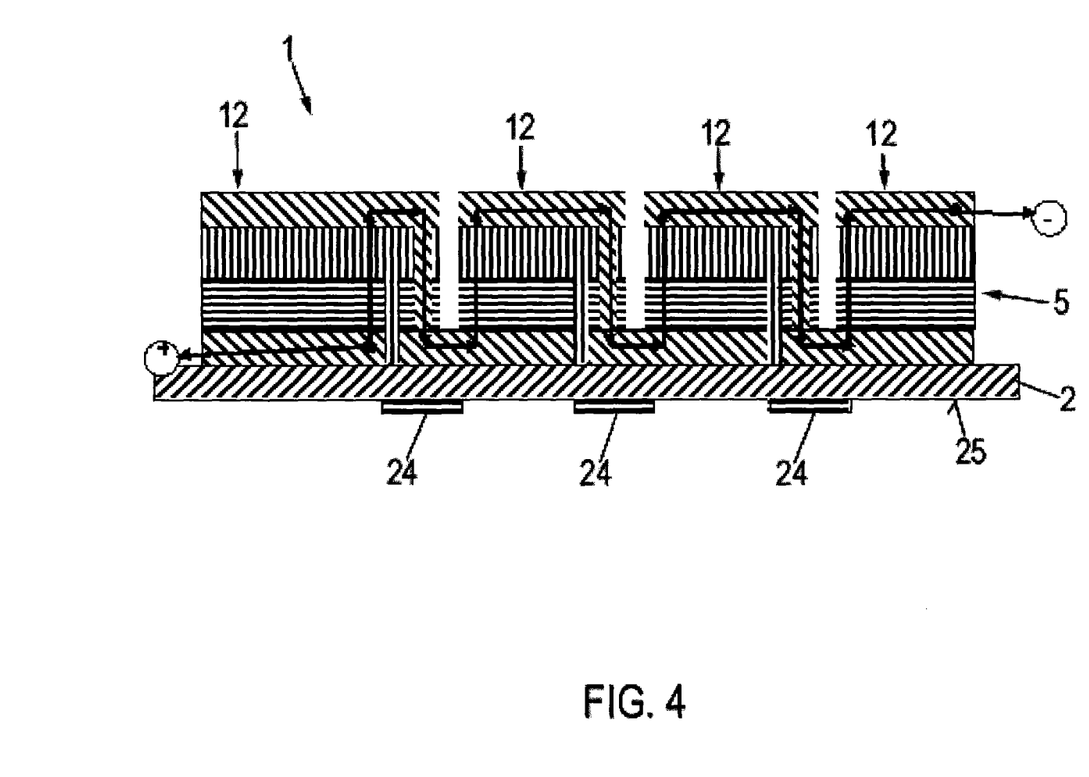
FIG. 4 a schematic cross-sectional representation of another exemplary embodiment of the electrochromic glazing according to the invention.

FIG. 4 depicts another exemplary embodiment of the electrochromic glazing 1 according to the invention, wherein again only the differences relative to the exemplary embodiment depicted in FIGS. 1 and 2 are explained, referring. for the rest, to the statements made there. According to it, the electrochromic glazing 1 comprises a plurality of opaque (nontransparent) strips 24 that are applied on a second surface 25 of the substrate 2 opposite the first surface 6. The strips 24 are situated, in each case, in the region of the transition zones 13 and completely cover them such that the transition zones 13 are no longer discernible on this side for an observer. Thus, the aesthetic appearance of the electrochromic glazing 1 can be improved.

Figure 5:
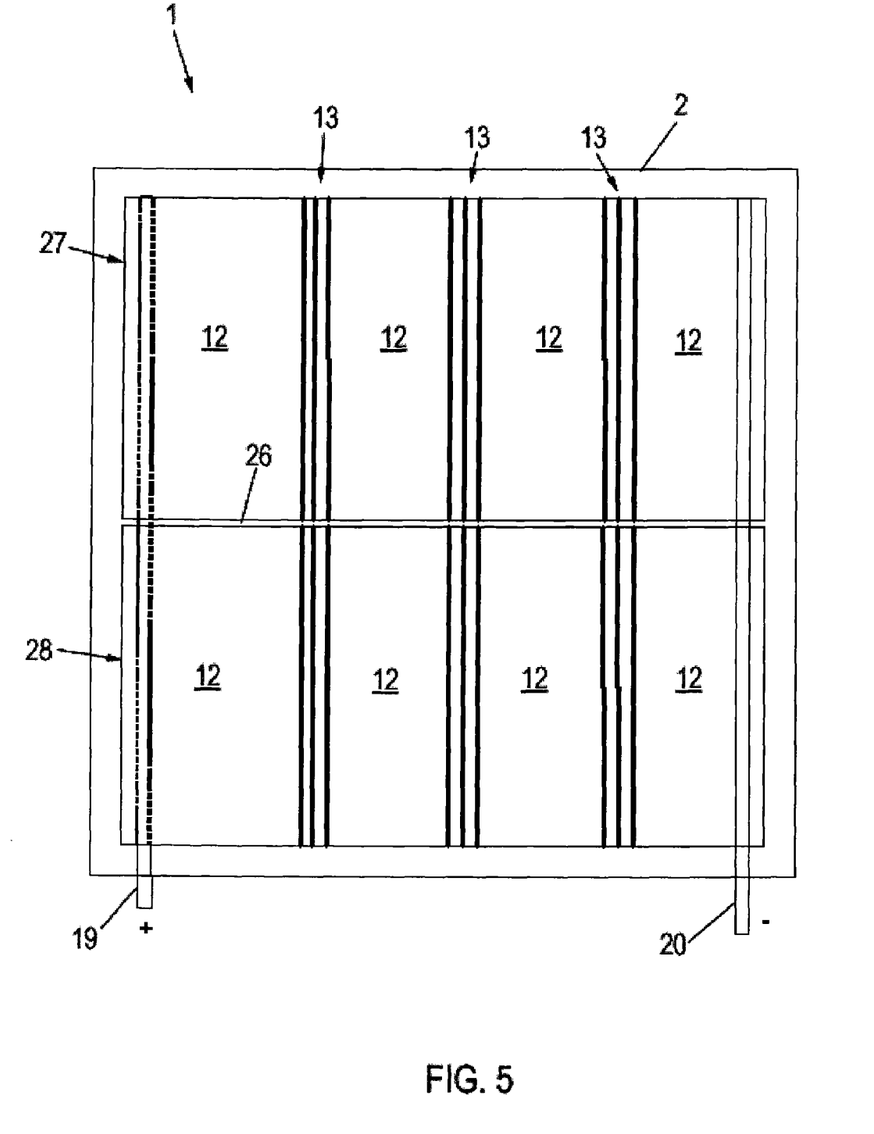
FIG. 5 a schematic top view of another exemplary embodiment of the electrochromic glazing according to the invention.

FIG. 5 depicts another exemplary embodiment of the electrochromic glazing 1 according to the invention, wherein only the differences relative to the exemplary embodiment depicted in FIGS. 1 and 2 are explained, referring. for the rest, to the statements made there. According to it, the layer structure 5 of the electrochromic glazing 1 is subdivided, by a fourth trench 26 running perpendicular to the first through the third trenches 14-16, into two cell regions 27, 28 electrically insulated from each other, which contain, in each case, four series-connected electrochromic cells. The two cell regions 27, 28 are connected in parallel by the two contact strips 19, 20. For this purpose, the first contact strip 19 is connected to the two marginal first electrode sections 17 and the second contact strip 20 is connected to the two marginal second electrode sections 18. It would also be conceivable to configure the two cell regions 27, 28 as self-contained (sub)modules, each of which has its own first and second contact strips 19, 20, which are connected in parallel as hybrids or monolithically integrated. In addition, each cell region could have its own substrate 2. Although this is not shown in FIG. 5, a plurality of fourth trenches 26 could be provided, by means of which the layer structure 5 is subdivided into more than two cell regions 27, 28.

The electrochromic glazing 1 depicted in the figures can, for example, be produced in the following manner:

Application of the first electrode layer 7 and, subsequently, of the second active layer 8, as well as of the electrolyte layer 9 on the substrate 2;

Formation of the first trenches 14, by means of which, in particular, the first electrode layer 7 is structured;

Application of the first active layer 10, in the process, filling the first trenches 14;

Formation of the third trenches 16, by means of which, in particular, the two active layers 8, 10 are structured;

Application of the second electrode layer 11, in the process, filling the third trenches 16;

Formation of the second trenches 15, by means of which, in particular, the second electrode layer 11 is structured;

Production of the two contact strips 19, 20, wherein the first contact strip 19 is connected to the anode connection 3 and the second contact strip 20 is connected to the cathode connection 4 of the power source;

Optional application of the strips 24 on the substrate 2;

Optional application of a top coating or laminating layer, in the process, filling the second trenches 15;

Optional connection to another (transparent) substrate such that the layer structure 5 is arranged between the two substrates.

In an alternative procedure, the first electrode layer 7 is structured immediately after its application by formation of the first trenches 14, wherein, subsequently, the other layers are applied and structured. In the process, the first trenches 14 are filled with the material of the second active layer 8.

The trenches 14-16 can be formed by various conventional techniques, wherein, for this purpose, in particular, laser writing or laser ablation, mechanical ablation, liftoff techniques, or etching techniques, for example, using etching pastes, can be used. For laser ablation, it can be preferable for the first trenches 14 to be formed by a laser with a wavelength in the ultraviolet (UV) wavelength range, the second trenches 15 at a wavelength of 532 nm or 1064 nm, and the third trenches 16 at a wavelength of 532 nm. The strips 24 can, for example, be applied on the substrate 2 by means of cover screenprinting, wherein any other suitable technique can also be used.

The invention makes available an electrochromic glazing whose switching times are reduced in comparison with comparable conventional glazing by subdivision into electrochromic cells, in particular, in the case of large surface area glazings. The monolithically integrated, series connection of the cells can be cost-effectively realized in industrial series production by conventional techniques. The trenches contained in the optically inactive transition zones are visible to the observer as fine lines and can be covered by opaque strips in order to the improve the external appearance. They can, in particular, also serve as distinguishing characteristics for rapidly switching electrochromic glazings. Each electrochromic cell can be protected against transient voltage peaks by means of an anti-parallel-connected diode. The total voltage applied to the electrochromic glazing for the switching process can, as desired, be selected such that a maximum value is not exceeded, for example, in order to comply with legal requirements. The voltage applied to each cell during the switching procedure can be determined by the number of cells. A parallel connection of the plurality of cell regions enables production of particularly large-area electrochromic glazings, without an undesirable increase in the switching voltage required.

One aspect of the invention comprises an electrochromic glazing 1 with at least one substrate 2 and a layer structure 5 applied on the substrate 2, wherein the layer structure 5 has at least two electrode layers 7, 11, between which a first electrochemically active layer 10 and a second electrochemically active layer 8 are situated, which are, in each case, suitable for the reversible incorporation of ions, wherein the first active layer 10 consists of an electrochromic material and serves as a coloring layer and the second active layer 8 serves as an ion storage layer, and wherein the two active layers 8, 10 are separated from each other by an electrolyte layer 9. The layer structure 5 is subdivided into series-connected electrochromic cells 12 by one or a plurality of transition zones 13, wherein each transition zone 13 comprises:

a first trench 14, by which a first of the two electrode layers 7 is subdivided into first electrode sections 17 electrically insulated from each other;

a second trench 15, by which a second of the two electrode layers 11 is subdivided into second electrode sections electrically insulated from each other 18;

a third trench filled with an electrically conductive material 16, by which the first electrode section 17 and the second electrode section 18 of the cells 12 adjacent the transition zone 13 are electrically connected to each other;

wherein the third trench 16 is arranged between the first trench 14 and the second trench 15.

Another aspect of the invention comprises a method for production of an electrochromic glazing 1 with the following steps:

Preparation of a substrate 2 with a layer structure 5 applied on the substrate 2, wherein the layer structure 5 has at least two electrode layers 7, 11, between which a first electrochemically active layer 10 and a second electrochemically active layer 8 are situated, which are, in each case, suitable for the reversible incorporation of ions, wherein the first active layer 10 consists of an electrochromic material and serves as a coloring layer and the second active layer 8 serves as an ion storage layer, and wherein the two active layers 8, 10 are separated from each other by an electrolyte layer 9;

Production of first trenches 14, by which a first of the two electrode layers 7 is subdivided into first electrode sections 17 electrically insulated from each other;

Production of second trenches 15, by which the second of the two electrode layers 11 is subdivided into second electrode sections 18 electrically insulated from each other;

Production of third trenches 16 filled with an electrically conductive material, which are, in each case, arranged between a first trench 14 and a second trench 15, wherein, in each case, a first electrode section 17 and a second electrode section 18 are electrically connected to each other via the third trenches 16.

LIST OF REFERENCE CHARACTERS

1 Electrochromic glazing
2 Substrate
3 Anode connection
4 Cathode connection
5 Layer structure
6 First surface
7 First electrode layer
8 Second active layer
9 Electrolyte layer
10 First active layer
11 Second electrode layer
12 Cell
13 Transition zone
14 First trench
15 Second trench
16 Third trench
17 First electrode section
18 Second electrode section
19 First contact strip
20 Second contact contact strip
21 Diode
22 First conductor
23 Second Conductor
24 Strip
25 Second surface
26 Fourth trench
27 First cell region
28 Second cell region

The invention claimed is:

1. An electrochromic glazing, comprising:
a substrate; and
a layer structure disposed on the substrate, wherein the layer structure comprises at least a first electrode layer and a second electrode layer, between which a first electrochemically active layer and a second electrochemically active layer are situated, which each reversibly incorporate ions, wherein the first active layer comprises an electrochromic material, and wherein the first and second active layers are separated from each other by an electrolyte layer,
wherein the layer structure is subdivided into series-connected electrochromic cells by one or a plurality of transition zones, each transition zone comprising:
a first trench, by which the first electrode layer is subdivided into first electrode sections electrically insulated from each other;
a second trench, by which the second electrode layer is subdivided into second electrode sections electrically insulated from each other; and
a third trench filled with an electrically conductive material, by which the first electrode section and the second electrode section of the electrochromic cells adjacent the transition zone are electrically connected to each other, wherein the third trench is arranged between the first trench and the second trench.

2. The electrochromic glazing of claim 1, wherein the second electrode layer is arranged above the first electrode layer, and
wherein the third trench of each transition zone is filled with the electrically conductive material of the second electrode layer.

3. The electrochromic glazing of claim 1, wherein the first trench of each transition zone is filled with material of one of the first layer, the second active layer, or the electrolyte layer.

4. The electrochromic glazing of claim 3, wherein the first trench of each transition zone is filled with the material of the second active layer that is arranged above the respective first active layer.

5. The electrochromic glazing of claim 2, wherein the second trench of each transition zone subdivides the layer structure all the way to the first electrode section.

6. The electrochromic glazing of claim 2, wherein the layer structure further comprises a top coating comprising an electrically insulating material arranged above the second electrode layer, and
wherein the second trench of each transition zone is filled with the insulating material of the top coating.

7. The electrochromic glazing of claim 1, wherein each electrochromic cell comprises a device, which limits voltage and is in the form of an antiparallel-connected diode having a predefined breakdown voltage.

8. The electrochromic glazing of claim 1, wherein each transition zone has a maximum width in the range from 100 µm to 500 µm.

9. The electrochromic glazing of claim 8, wherein a distance between adjacent trenches of one and the same transition zone is at least 50 µm.

10. The electrochromic glazing of claim 8, wherein a width of the first, second, or third trench in the transition zone is in the range from 30 µm to 100 µm.

11. The electrochromic glazing of claim 1, further comprising:
an opaque cover element,
wherein the opaque cover layer is disposed on a side of the substrate turned away from the layer structure, and is associated in each case with a transition zone and completely covers it.

12. The electrochromic glazing of claim 1, wherein the layer structure is arranged between the substrate and a second substrate.

13. The electrochromic glazing of claim 1, wherein the layer structure is subdivided by one or a plurality of fourth trenches into a plurality of cell regions electrically insulated from each other, which each comprise the plurality of series-connected electrochromic cells, wherein the cell regions are connected in parallel.

14. A method for producing an electrochromic glazing, the method comprising:
applying a layer structure on a substrate, wherein the layer structure comprises at least a first electrode layer and a second electrode layer, between which a first electrochemically active layer and a second electrochemically active layer are situated, which each reversibly incorporate ions, wherein the first active layer comprises an electrochromic material and wherein the first and second active layers are separated from each other by an electrolyte layer;
forming a first trench, by which the first electrode layer is subdivided into first electrode sections electrically insulated from each other;
forming a second trench, by which the second electrode layer is subdivided into second electrode sections electrically insulated from each other;
forming a third trench and filling the third trench with an electrically conductive material, wherein the third trench is arranged between the first trench and the second trench,
wherein, in each case, a first electrode section and a second electrode section are electrically connected to each other via the third trench.

15. A process for partially delimiting a space in at least one selected from the group consisting of an architectural facility, a motor vehicle, an aircraft, and a watercraft, the process comprising:
incorporating the glazing of claim 1 into at least one selected from the group consisting of an architectural facility, a motor vehicle, an aircraft, and a watercraft.

16. The electrochromic glazing of claim 1, wherein each transition zone has a maximum width in the range from 150 µm to 250 µm.

* * * * *